(12) United States Patent
Etchepare et al.

(10) Patent No.: US 11,926,560 B2
(45) Date of Patent: Mar. 12, 2024

(54) INSTALLATION FOR TREATING GLASS CONTAINERS COMPRISING A CHAMBER FOR METERING TREATMENT SUBSTANCE HAVING A DOUBLE SHUTTER, AND ASSOCIATED METHOD

(71) Applicant: SGD S.A., Paris (FR)

(72) Inventors: Pierre-Luc Etchepare, Rouen (FR); Christophe Depoilly, Aigneville (FR); Jingwei Zhang, Massy (FR)

(73) Assignee: SGD S.A., Paris (FR)

( * ) Notice: Subject to any disclaimer, the term of this patent is extended or adjusted under 35 U.S.C. 154(b) by 0 days.

(21) Appl. No.: 17/782,375

(22) PCT Filed: Nov. 27, 2020

(86) PCT No.: PCT/FR2020/052207
§ 371 (c)(1),
(2) Date: Jun. 3, 2022

(87) PCT Pub. No.: WO2021/111066
PCT Pub. Date: Jun. 10, 2021

(65) Prior Publication Data
US 2023/0016184 A1 Jan. 19, 2023

(30) Foreign Application Priority Data

Dec. 5, 2019 (FR) ...................................... 1913822

(51) Int. Cl.
*C03C 23/00* (2006.01)
(52) U.S. Cl.
CPC .......... *C03C 23/008* (2013.01); *C03C 23/007* (2013.01)

(58) Field of Classification Search
None
See application file for complete search history.

(56) References Cited

FOREIGN PATENT DOCUMENTS

| BE | 459427 A | 8/1945 | |
| CN | 1087326 A | 6/1994 | |
| RU | 2318191 C2 * | 2/2008 | ........... G01G 13/028 |
| WO | 2007062694 A1 | 6/2007 | |
| WO | 2019166719 A1 | 9/2019 | |

OTHER PUBLICATIONS

Translation of RU 2318191 (Year: 2008).*

* cited by examiner

*Primary Examiner* — Cynthia Szewczyk
(74) *Attorney, Agent, or Firm* — Nath, Goldberg & Meyer; Joshua B. Goldberg

(57) ABSTRACT

The invention relates to an installation (1) for treating the inner face (6) of the wall (3) of a glass container (2), which wall (3) delimits a receiving cavity (4) and an opening (5) providing access to the cavity (4), the installation (1) comprising a source (12) of a treatment substance (13) and a means (15) for dispensing the treatment substance (13) into the cavity (4) of the container (1), said dispensing means (15) comprising a metering chamber (16) which extends between an inlet orifice (18) and an opposite outlet orifice (19) intended to be positioned above the opening (5) of the container, and also an upper shutter (20) and a lower shutter (21) for the chamber (16), which are positioned in a tiered manner at the inlet orifice (18) and the outlet orifice (19), respectively, of the chamber (16).
Installations and methods for treating glass containers.

22 Claims, 3 Drawing Sheets

INSTALLATION FOR TREATING GLASS CONTAINERS COMPRISING A CHAMBER FOR METERING TREATMENT SUBSTANCE HAVING A DOUBLE SHUTTER, AND ASSOCIATED METHOD

This is a National Phase Application filed under 35 U.S.C. 371 as a national stage of PCT/FR2020/052207, filed Nov. 27, 2020, an application claiming the benefit of French Application No. 1913822, filed Dec. 5, 2019, the content of each of which is hereby incorporated by reference in its entirety.

TECHNICAL FIELD

The present invention relates to the general technical field of installations and methods for the treatment of glass containers.

PRIOR ART

The invention more particularly relates to an installation for treating the inner face of the wall of a glass container, such as a vial, which wall delimits an accommodation cavity for a product and an opening providing access to said accommodation cavity, said installation comprising a source of powder or granular treatment substance and a means for dispensing said treatment substance into the accommodation cavity of the container. The invention also relates to a method for treating the inner face of the wall of a glass container, such as a vial, which wall delimits an accommodation cavity for a product and an opening providing access to said accommodation cavity, said method comprising the supply of a source of powder or granular treatment substance and a step of dispensing said treatment substance into the accommodation cavity of the container using a dispensing means.

In the field of pharmaceutical glass primary packaging, the purpose is to propose containers, in particular of the vial type, that have an excellent chemical compatibility with the product or preparation they are intended to contain. Indeed, the aim is to prevent any harmful interaction between a species from the glass forming the container and the product contained by the latter. In this respect, it is known to subject glass containers, before their use, to a particular so-called dealkalization treatment that consists in extracting, over a depth of several dozens of nanometres, the alkaline ions—and in particular the sodium ions—present in the vicinity of the surface of the inner wall of the container, and evacuating them, in order to avoid as much as possible the elution of the alkaline ions over time into the product contained by the container. Such a treatment is generally carried out by introducing into a glass container to be treated a reactive treatment substance that is capable, under the action of heat, to generate an acid gas likely to chemically react with the alkaline ions present in the glass of the container. Extraction of the alkaline ions from the surface of the inner wall of the container thus makes it possible in particular to significantly improve the chemical resistance (or hydrolytic resistance) of the container.

Treatment installations are thus known, which comprise a means for dispensing a treatment substance formed of ammonium sulphate $(NH_4)_2SO_4$ for example, in the form of a crystalline powder or tablets or briquettes, into hot glass containers. Under the effect of heat, the ammonium sulphate introduced into the container sublimates and forms a gas that reacts with the sodium contained in the glass in the immediate vicinity of the inner wall of the container. The sodium so extracted from the glass is then deposited at the surface of the inner wall of the container in the form of a residual powder compound of sodium sulphate $Na_2SO_4$, which can then be removed by washing.

In practice, the implementation of such known treatment installations has a number of drawbacks. Indeed, if the installations designed to dispense a treatment substance as tablets generally allow a relatively accurate dispensing of the treatment substance into containers with large ring opening, it is often difficult, if not impossible, given the size of the tablets, to efficiently treat that way containers of small volume and/or small ring opening diameter, and especially at high rates. The installations designed to dispense a powder treatment substance comprise a means for dispensing the treatment substance in the form of a diffuse and continuous flow of treatment substance that flows freely on glass containers in motion on a conveyor located under the dispensing means. The continuous nature of the dispensing allows de facto treatment of containers at a relatively high rate. However, it is particularly difficult to accurately control the dose of treatment substance really introduced into the containers. It results therefrom a certain uncertainty as to the level of dealkalization actually achieved, but also in terms of control of the repeatability of the treatment made from one glass container to another. Moreover, such a powder treatment substance dispensing, in the form of a diffuse and continuous flow, leads to a simultaneous treatment of the surface of the inner and outer walls of the containers, and hence to the presence of residual powder compounds on these latter, which considerably reduces the transparency of the so-treated container. This greatly impairs the subsequent optical control of the treated containers, designed for detecting potential glass defects in these latter. Moreover, the deposition and reaction of the treatment substance on the outer wall of the containers, and in particular at the ring of these latter, may lead to aesthetic defects, or even a local weakening of the containers. Finally, such a powder treatment substance dispensing, in the form of a diffuse and continuous flow, generates a loss of treatment substance by dispersion of the latter on the conveyor and to the ground, and requires frequent cleaning and maintenance of the installation, which is not without economic, health and environmental consequences.

DISCLOSURE OF THE INVENTION

The objects assigned to the present invention therefore aim to remedy the different drawbacks listed hereinabove, and to propose a new installation, as well as a corresponding method, which allow treating in a particularly accurate and efficient manner glass containers of any size and capacity, and that at very high rates.

Another object of the invention aims to propose a new treatment installation, as well as a new corresponding treatment method, which allow treating glass containers in a particularly reliable and repeatable manner.

Another object of the invention aims to propose a new treatment installation, as well as a new corresponding treatment method, which allow treating efficiently glass containers without degrading the mechanical strength thereof.

Another object of the invention aims to propose a new treatment installation, as well as a new corresponding treatment method, whose implementation is particularly simple and economical.

Another object of the invention aims to propose a new treatment installation, as well as a new corresponding treatment method, whose implementation is particularly safe.

Another object of the invention aims to propose a new treatment installation, as well as a new corresponding treatment method, which allow obtaining glass containers having an excellent hydrolytic resistance.

The objects assigned to the invention are achieved by means of an installation for treating the inner face of the wall of a glass container, such as a vial, which wall delimits an accommodation cavity for a product and an opening providing access to said accommodation cavity, said installation comprising a source of powder or granular treatment substance and a means for dispensing said treatment substance into the accommodation cavity of the container, said installation being characterized in that said dispensing means comprises at least one dosing chamber that extends between an inlet port fed by said source of treatment substance and an opposite outlet port intended to be positioned above the opening of the container, as well as an upper shutter and a lower shutter of the dosing chamber positioned in a staggered manner at the inlet port and the outlet port, respectively, of the dosing chamber.

The objects assigned to the invention are achieved by means of a method for treating the inner face of the wall of a glass container, such as a vial, which wall delimits an accommodation cavity for a product and an opening providing access to said accommodation cavity, said method comprising the supply of a source of powder or granular treatment substance and a step of dispensing said treatment substance into the accommodation cavity of the container using a dispensing means, said method being characterized in that said dispensing means comprises at least one dosing chamber that extends between an inlet port fed by said source of treatment substance and an opposite outlet port intended to be positioned above the container opening, as well as an upper shutter and a lower shutter of the dosing chamber positioned in a staggered manner at the inlet port and the outlet port, respectively, of the dosing chamber.

BRIEF DESCRIPTION OF THE DRAWINGS

Other features and advantages of the invention will appear in more detail upon reading of the following description, with reference to the appended drawings, given by way of purely illustrative and non-limiting example(s), in which.

WAYS TO IMPLEMENT THE INVENTION

Figure 1:
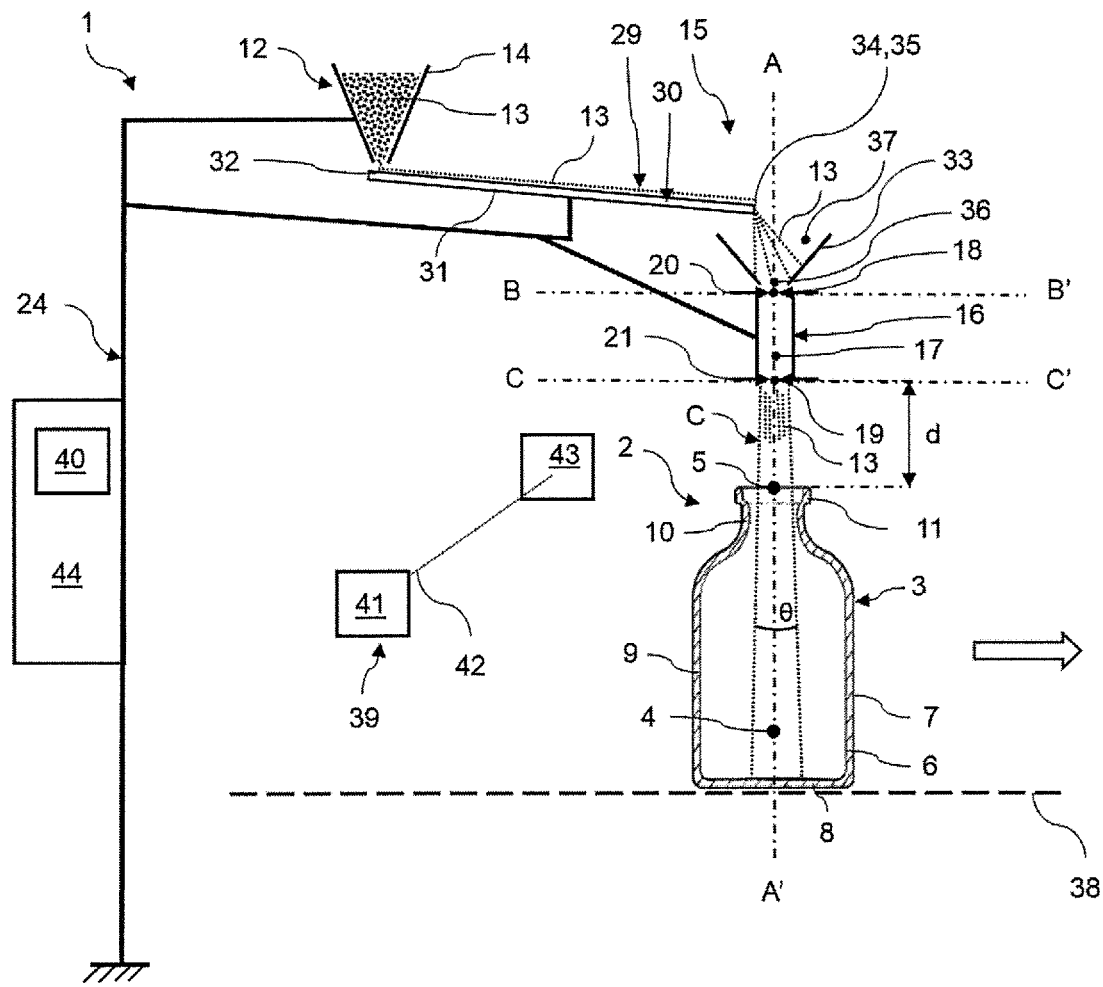
FIG. 1 schematically and partially illustrates a preferential embodiment of an installation according to the invention. Such an installation is advantageously designed to be arranged and implemented in combination with a conveyor, on which travels a container to be treated.

According to a first aspect, the invention relates to an installation 1 for treating a glass container 2, such as a vial. The invention further relates, according to a second independent aspect, to a method for treating such a glass container 2. More precisely, the container 2 concerned by the installation 1 and method according to the invention comprises a wall 3 delimiting an accommodation cavity 4 for a product (or substance) and an opening 5 providing access to said accommodation cavity 4, said glass wall 3 having an inner face 6, located facing said accommodation cavity 4, and preferentially intended to come into direct contact with said product, and an opposite outer face 7. Herein, the treatment installation 1 and method according to the invention are installation 1 and method for treating the inner face 6 of the wall 3 of such a glass container 2. The treatment installation 1 and method according to the invention are preferably industrial installation and method, advantageously automated, intended to be integrated to industrial glass container production line and method. In this respect, said installation 1 and said method are preferentially designed to allow the treatment of a large number of glass containers 2 in a substantially uninterrupted manner.

In the sense of the invention, the word "glass" refers to a mineral glass. Preferentially, the glass constituting the wall 3 of the container 2 is transparent (or at least translucent) in the visible domain. It may be indifferently either a colourless glass or a coloured glass, notably to protect the fluid substance contained in the container against the effects of light, in particular in certain wavelength ranges (UV, etc.). Preferentially made of moulded or drawn glass, and formed of a single, monolithic piece of glass, the container 2 the invention relates to may have any shape adapted to its function, such as for example the shape of a vial or a bottle. As illustrated by way of example in FIG. 1, the wall 3 of the container 2 is advantageously formed by a glass bottom 8, a glass lateral wall 9 that rises from the periphery of the bottom 8, and a neck 10 provided with a ring 11 that delimits the opening 5 of the container 2, to allow the accommodation cavity 4 to be put in communication with the outside. Advantageously, said opening 5 is designed so as to be able to be closed by a removable or pierceable plug or membrane seal.

Preferably, the product intended to be received into the cavity 4 of the container 2 is advantageously fluid, i.e. likely to flow like, for example, a liquid, pasty (such as a liquid with a high degree of viscosity) or powder substance. Preferably, it is a pharmaceutical product or a substance, such as for example a medication, potentially intended to be administered by parenteral route (general or locoregional) or to be ingested or absorbed by a patient, or also a diagnostic substance, as for example a chemical or biological reagent. By extension, the container 2 can be designed to contain a biological substance (or body fluid), such as for example blood, a blood product or by-product, urine, etc. Even if the application to the pharmaceutical and diagnostic fields is preferred, the invention is however not limited to the treatment of pharmaceutical and diagnostic containers 2 and may in particular also relate to a container designed to contain a liquid, pasty or powder substance for industrial (storage of chemical products, etc.), scientific (laboratory glassware), veterinary, food or also cosmetic use.

An embodiment of the installation 1 is schematically and partially illustrated in FIG. 1. In accordance with the invention, the installation 1 comprises a source 12 of a treatment substance 13, i.e. an advantageously reactive substance, intended for obtaining the searched treatment effect. More specifically, it is a powder or granular treatment substance 13, advantageously formed of crystals or grains of average size typically between 500 μm and 1 600 μm). As such, said powder or granular treatment substance 13 is advantageously able to flow freely under its own weight due to gravity. For example, as illustrated in FIG. 1, such a source 12 may comprise a tank or hopper 14, adapted to receive and store at least temporarily an amount of ready-to-use treatment substance 13. As an alternative, the source 12 could comprise a device for manufacturing or preparing said treatment substance 13 in situ.

The installation 1 according to the invention further comprises a means 15 for dispensing the treatment substance 13 into the accommodation cavity 4 of the container 2, through the opening 5 of the latter. The dispensing means 15 is advantageously designed to dose and dispense a predetermined (or at least determinable) amount of said treatment substance 13. According to the invention, the dispensing means 15 comprises at least one chamber 16 for dosing said treatment substance 13. Containing a recess 17 intended to receive treatment substance 13, the dosing chamber 16 extends between an inlet port 18 fed by the source 12 of treatment substance 13 and an opposite outlet port 19 (and hence distinct from the inlet port 18) intended to be positioned above, and preferably facing, the opening 5 of a container 2 to be treated (FIG. 1). Said dosing chamber 16 is advantageously arranged vertically, the inlet port 18 forming an upper port, through which the treatment substance 13 can enter the internal recess 17 of the dosing chamber 16, whereas the outlet port 19 forms a lower port, advantageously intended to be positioned facing and just-above the opening 5 of the container 2, and through which the treatment substance 13 contained in the dosing chamber 16 can be dispensed, discharged, due to gravity, towards the opening 5 of said container 2 to be treated located under the outlet port 19 of the dosing chamber 16.

According to the invention, the installation 1 further comprises an upper shutter 20 (or upper valve) and a lower shutter 21 (or lower valve) of the dosing chamber 16, which are positioned in a staggered manner at the inlet port 18 and the outlet port 19, respectively, of the dosing chamber 16. The dosing chamber 16 is thus provided with an upper shutter 20 and a lower shutter 21, designed to close the inlet port 18 and the outlet port 19, respectively, of the dosing chamber 16. Arranged one below the other, in series or in cascade along an average direction of travel (or average direction of fall) of the treatment substance 13 in the dosing chamber 16, said upper 20 and lower 21 shutters are able to move between

- a closed configuration (FIGS. 2 and 3), in which they close the inlet port 18 of the dosing chamber 16, respectively the outlet port 19 of the dosing chamber 16, advantageously tightly with respect to the treatment substance 13, and
- an open configuration, in which they on the contrary clear the inlet port 18 of the dosing chamber 16, respectively the outlet port 19 of the dosing chamber 16, in such a way that the treatment substance 13 can enter the dosing chamber 16, respectively exit therefrom.

The implementation of such a dosing chamber 16 and such upper 20 and lower 21 shutters according to the invention makes it possible to dose and dispense in an accurate, fast and efficient manner an amount of the treatment substance 13 into a container 2 to be treated, the opening 5 of which is located under the outlet port 19 of the dosing chamber 16. As will be described more precisely hereinafter, it is indeed possible, by controlling the speed and frequency of opening/closing the upper 20 and lower 21 shutters, to form within the dosing chamber 16 an accurate dose of treatment substance 13, and to compact, pack, this dose of treatment substance 13, under the effect of its own weight, against the lower shutter 21, before letting the so-compacted dose flow towards the opening 5 of the container 2 to be treated. By adapting the shape, size and capacity of the dosing chamber 16 as required, it thus becomes possible to treat using the installation 1 glass containers of any size and capacity, and that even with very high rates.

Figure 2:
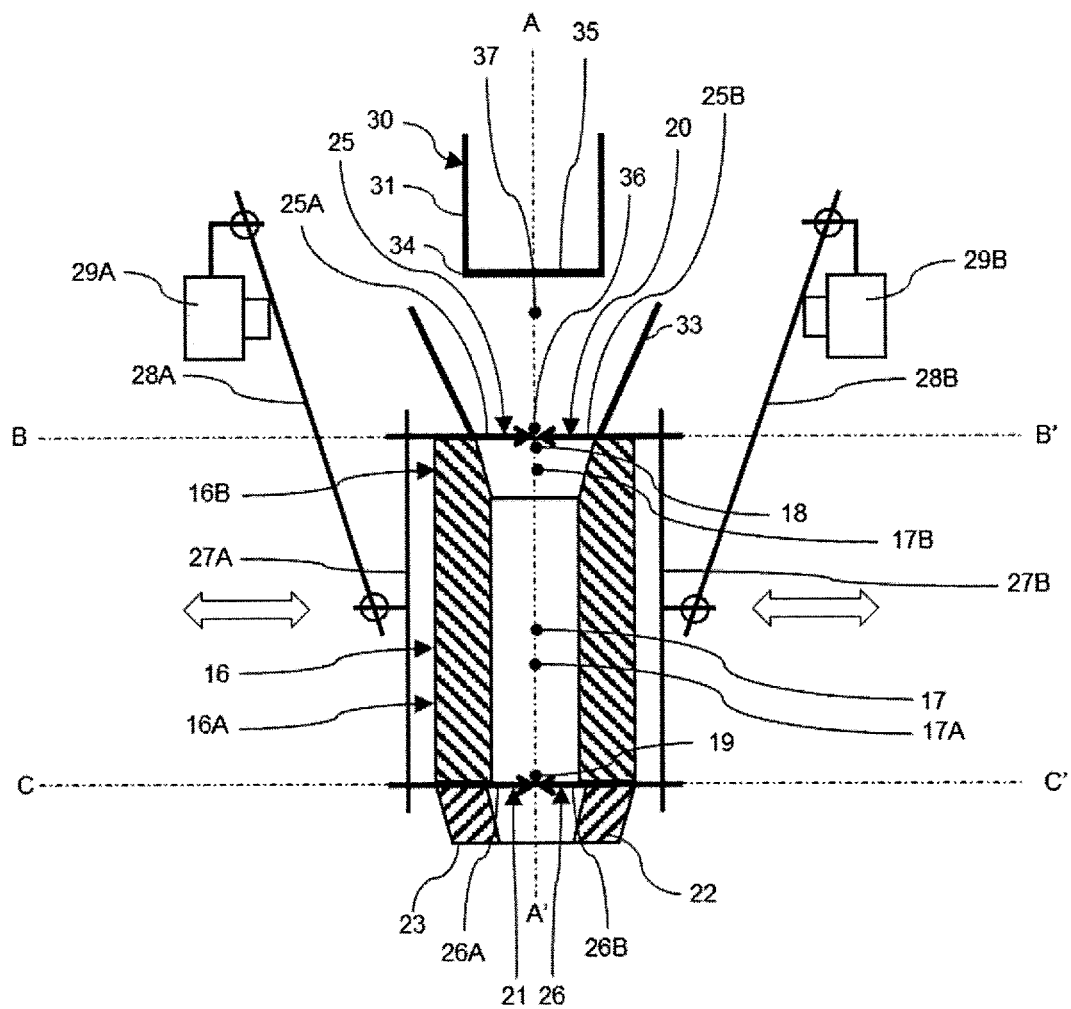
FIG. 2 schematically illustrates, in a partial front cross-sectional view, a detail of the dispensing means of the installation of FIG. 1.
Figure 3:
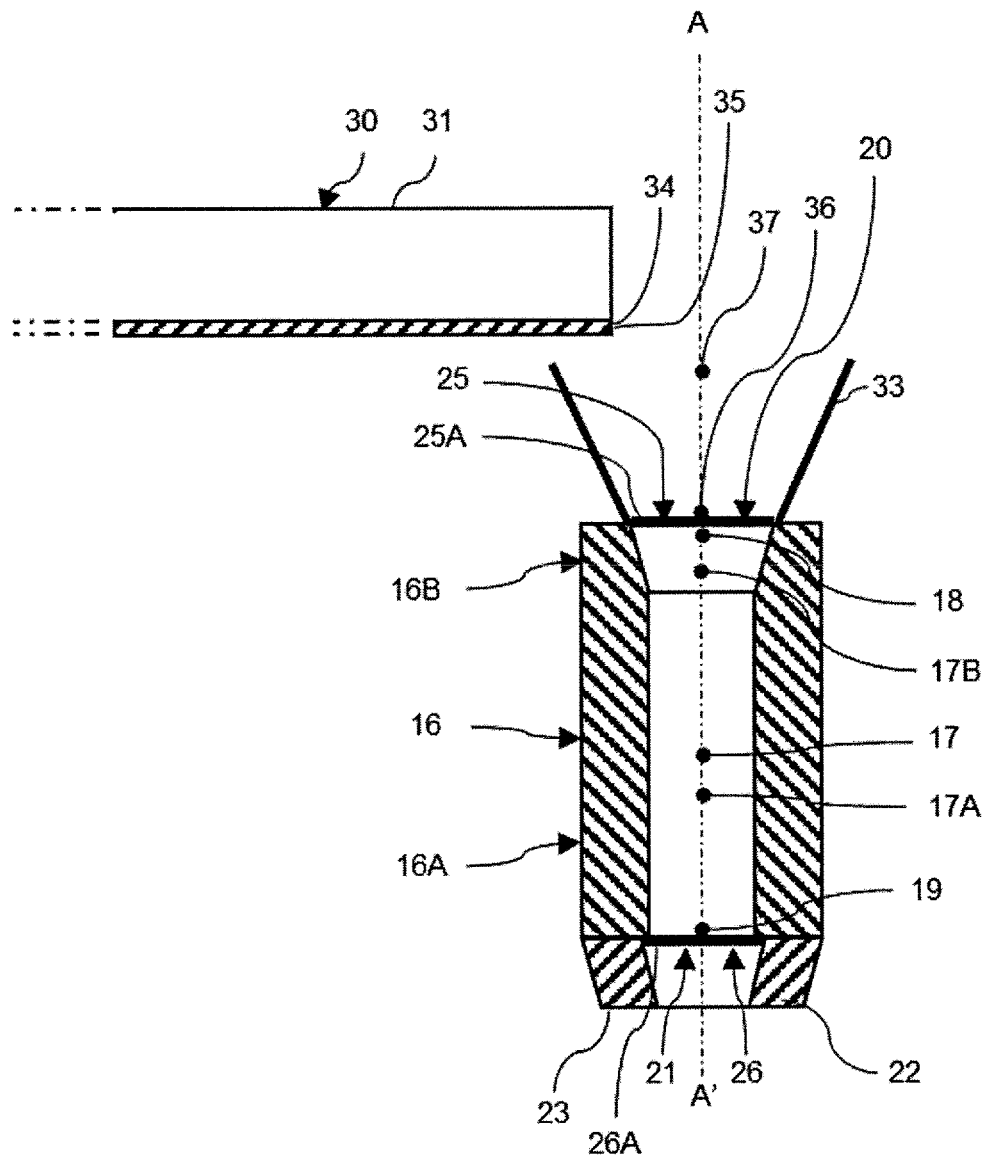
FIG. 3 schematically illustrates, in a partial longitudinal cross-sectional view, a detail of the dispensing means of the installation of FIG. 1.

Advantageously, and as illustrated in the Figures, the dosing chamber 16 extends longitudinally along a first axis A-A', from the inlet port 18 to the outlet port 19 of the dosing chamber 16. The dosing chamber 16 comprises at least one first chamber portion 16A, which extends along the first axis A-A', from the outlet port 19 to the inlet port 18 of the dosing chamber 16, and which defines a first recess portion 17A of cylindrical shape, preferably of circular cross-section, oriented axially along the first axis A-A'. The volume of said first recess portion 17A is advantageously chosen as a function of the amount of treatment substance 13 that is desired to be introduced into the container 2 to be treated. The diameter (or width) of said first recess portion 17A is advantageously chosen lower than the diameter (or width) of the opening 5 of the container 2 to be treated. For example, the diameter of said first recess portion 17A can then be between 3 mm and 20 mm, for containers 2 to be treated, the diameter of the opening 5 of which is between 10 mm and 30 mm. Thus, the amount of treatment substance 13 dosed by the dosing chamber 16 can advantageously flow out of the dosing chamber 16, during the opening of the lower shutter 21, according a substantially "straight" or generally cylindrical trickle. That way, the risk of spatial dispersion of the treatment substance 13 at the exit of the dosing chamber 16 is strongly limited, and the introduction into the cavity 4 of the container 2 of substantially all the amount of treatment substance 13 dosed and dispensed by the dosing chamber 16 is therefore facilitated. As illustrated in FIGS. 2 and 3, the dosing chamber 16 may advantageously comprise a second chamber portion 16B, which axially extends said first chambre portion 16A up to the inlet port 18 of the dosing chamber 16, and which defines a second recess portion 17B of truncated shape (funnel shape) in order to guide the treatment substance 13 passing through the inlet port 18 of the dosing chamber 16 during the opening of the upper shutter 20 towards the second chamber portion 16B.

Of course, the dosing chamber 16 could define an inner recess of a different shape to that described above. In any case, it however remains advantageous that the dosing chamber 16 is shaped and configured in such a way that the treatment substance 13 can flow out of the dosing chamber 16, through the outlet port 19 of the latter, as a dispensing cone C that is narrow enough relative to the opening 5 of the container 2 to be treated so that at least a predetermined amount of the dispensed treatment substance 13 can end up inside the cavity 16 of the container 2 positioned under the outlet port 19 of the dosing chamber 16. It is hence made sure that the container 2 in question receives at least a predetermined amount of the treatment substance 13 chosen sufficient to obtain the desired level of treatment of said container 2. It is even more advantageous that the dosing chamber 16 is shaped and configured in such a way that the dispensing cone C is narrow enough relative to the opening 5 so that substantially all the amount dosed and dispensed by the dosing chamber 16 can end up inside the cavity 4 of the container 1. In other words, and as schematically illustrated in dotted line in FIG. 1, said dispensing cone C has a cross-section, included in a plane in which the opening 5 of the container 2 is inscribed, whose size is lower than that of said opening 5 of the container 2 in said plane, in such a way that all the amount dosed and dispensed by the dosing chamber 16 (to within the potential unavoidable but nevertheless negligible losses) can be introduced into the cavity 4 of the container 2, and hence with substantially no dispersion of treatment substance 13 next to the container 2 or on the outer face 7 of the wall 3 and the ring 11 of the latter. It will be noted that, in the context of the invention, "dispensing cone" is not to be considered according to a strict mathematical definition of the term "cone", but preferentially means a dummy envelope (whether conical, frustoconical, or even ideally substantially cylindrical) inside which is contained substantially all the amount of treatment substance 13 dosed and dispensed by the dosing chamber 16 towards the cavity 5 of the container 2. This avoids any problematic dispersion of treatment substance 13 on the ring and/or on the outer face 7 of the wall 3 of the container 2, or even next to said container 2.

Potentially, the installation 1 may comprise an outlet nozzle 22, arranged axially under and facing the outlet port 19 of the dosing chamber 16 and the lower shutter 21, the latter being then interposed between the dosing chamber 16 and the outlet nozzle 22. Having at its lower end 23 an outlet diameter advantageously lower than or equal to the respective diameter of the first recess portion 17A, such a nozzle 22 makes it possible, as the case may be, to further improve the accuracy of dispensing of the treatment substance 13, by limiting in particular any effect of spatial dispersion of the treatment substance 13 that could be due to the shape and operation of the lower shutter 21.

Preferentially, the installation 1 comprises a frame 24, that is to say a support structure, intended to be immobilised with respect to the ground, and the dosing chamber 16 is immobilised with respect to said frame 24. The dosing chamber 16 can hence be immobilised with respect to the ground, in particular during the operation of the installation 1 (both in translation and in rotation), the upper 20 and lower 21 shutters remaining respectively in position at the inlet 18 and outlet 19 ports of the dosing chamber 16. Such a fixed, immobile, nature of the dosing chamber 16 contributes to the simplicity of design and implementation of the latter, to the robustness and reliability of operation thereof, to the accuracy of dosing of the treatment substance 13 by the dosing chamber 16, as well as to the speed and spatial accuracy of dispensing of said treatment substance 13 into the container 2 to be treated. Moreover, the absence of movement of the dosing chamber 16 contributes to limit the risk of detachment of the particles, in particular metal particles, by rubbing of the dosing chamber 16 with the treatment substance 13 when the grains or crystals of the latter are particularly hard and abrasive, and hence to limit the risk of contamination of the container 2 by such particles.

The installation 1 advantageously comprises means for operating the upper 20 and lower 21 shutters configured to operate the opening, respectively the closing, of said upper 20 and lower 21 shutters. According to a variant (not illustrated), said operating means are designed and configured to operate the opening (respectively the closing) of the upper 20 and lower 21 shutters in an asynchronous, sequential manner. In such a case, the opening (respectively closing) of the upper shutter 20 is thus not simultaneous, concomitant, to the opening (respectively closing) of the lower shutter 21. For example, the operating means of the upper 20 and lower 21 shutters may be designed and configured to operate simultaneously the opening of the upper shutter 20 and the closing of the lower shutter 21, in such a way that the inner recess 17 of the dosing chamber 16 is never in free communication with the outside simultaneously by the inlet 18 and outlet 19 ports of the dosing chamber 16.

According to a preferential alternative, retained in the embodiment schematically illustrated in FIG. 2, the operating means of the upper 20 and lower 21 shutters are, on the contrary, designed and configured to operate the opening, respectively the closing, of said upper 20 and lower 21 shutters in a simultaneous, synchronous, manner. The opening (respectively closing) of the upper shutter 20 is thus concomitant, to the opening (respectively closing) of the lower shutter 21. Thus, in open configuration of the upper 20 and lower 21 shutters, the upper shutter 20 retains treatment substance 13 coming from the source 12 out of the dosing chamber 16. When the upper 20 and lower 21 shutters switch from their closed configuration to their open configuration under the effect of said operating means, the treatment substance 13 initially retained by the upper shutter 20 falls, flows, into the dosing chamber 16 towards the outlet port 19 of the latter. The return of the upper 20 and lower 21 shutters to the closed configuration leads to the interception, by the lower shutter 21, of the flow of treatment substance 13 flowing through the dosing chamber 16. An amount of treatment substance 13, which has been able to enter the dosing chamber 16 whereas the upper 20 and lower 21 shutters were in open configuration, is therefore accumulated, packed, compacted, as a block in the dosing chamber 16 in contact with the lower shutter 21, under the effect of its own weight. Then, when the upper 20 and lower 21 shutters return to their open configuration, this so-dosed and compacted amount of treatment substance 13 then exits from the dispensing chamber 16 through the outlet port 19 of the latter and falls, in a substantially rectilinear, vertical, manner, towards the opening 5 of the container 2 to be treated positioned under the outlet port 19, as a compact dose of treatment substance 13 of low spatial dispersion. Simultaneously, a new amount of treatment substance 13 enters the dosing chamber 16 through the inlet port 18 of the latter. By controlling, using the operating means of the upper 20 and lower 21 shutters, the duration and/or speed and/or frequency of closing and opening of the upper 20 and lower 21 shutters, it is hence possible to accurately dose and compact a predetermined amount of treatment substance 13, and to dispense it rapidly and accurately into the cavity 4 of the container 2 through the opening 5 of the latter.

The above-described dosing and compacting principle would be substantially identical in the case where the operating means of the upper 20 and lower 21 shutters are designed and configured to operate the opening (respectively the closing) of the upper 20 and lower 21 shutters in an asynchronous, sequential manner. However, it has been observed that a simultaneous operation of the upper 20 and lower 21 shutters, in addition to contributing to the simplicity of design and reliability of operation of the dispensing means of the installation 1, allows an even more accurate dosing of the amount of treatment substance 13 to be dispensed, and a generally faster and more spatially accurate dispensing into the container 2 to be treated of the so-dosed treatment substance 13. In particular, according to preferential embodiment, the feeding of the dosing chamber 16 with treatment substance 13 and the emptying thereof may be made simultaneously, in such a way that a plurality of containers 2 can thus be treated successively, at a high rate, with a single and same dosing chamber 16, without having to use at least two dosing chambers, one fed with the treatment substance 13, whereas the other dispenses into the container the treatment substance 13 it contains.

Each of the upper 20 and lower 21 shutters advantageously comprises a shutting element 25, 26 that is mounted movable or mounted within a shutter body fastened to (or formed at least in part by) the dosing chamber 16, and which is adapted to move between at least an open position in which the shutting element is positioned outside the flow of treatment substance 13 in such a way as to allow the passage of the substance 13 through the corresponding inlet 18 or outlet 19 port, and a closed position in which the shutting element 25, 26 is on the contrary positioned through the flow of treatment substance 13 in such a way as to interrupt the latter and to forbit the passage of the substance 13 through the corresponding inlet 18 or outlet 19 port. Preferentially, the respective shutter element 25, 26 of the upper 20 and lower 21 shutters is designed to move according to a rectilinear motion of direction B-B', C-C' substantially orthogonal to an average direction of fall (average direction of flow) of the treatment substance 13 through the dosing chamber 16, which facilitates the design of the dispensing means 15 and allows a fast opening/closing of the dosing chamber 16. In the example illustrated in the Figures, said average direction of fall corresponds to the first axis A-A' of vertical extension of the dosing chamber 16.

Even more preferentially, and as illustrated in FIGS. 2 and 3, the respective shutting element 25, 26 of the upper 20 and lower 21 shutters comprises a pair of coplanar shovels 25A, 25B, 26A, 26B (or trapdoors) mounted movable in mirror image to each other. In other words, the upper 20 and lower 21 shutters thus form double-shovel guillotine valve (or double-knife gate valve). Compared with a configuration in which the shutting elements 25, 26 would include only one shovel, such a "double shovel" configuration advantageously makes it possible, for a given area of inlet 18 or outlet 19 port, to divide by two the time required for the opening, respectively the closing, of the input 18 or outlet 19 port by the shutter 20, 21. This contributes to further improve the accuracy of dosing of the amount of treatment substance 13 to be dispensed into the glass container 2, and also to improve the speed of dispensing of this dosed amount into the glass container 2, and hence to increase the treatment rate. Moreover, the use of such a shutter element 25, 26 with a double-shovel 25A, 25B, 26A, 26B, in particular as regards the lower shutter 21, advantageously allows an opening/closing of the shutter 20, 21 centred on the corresponding port 18, 19 of the dosing chamber 16, which makes it possible to limit the flow disturbance of the treatment substance 13, and thus contributes to guarantee an excellent accuracy of dispensing of the treatment substance 13 into the container 2 to be treated.

Advantageously, the operating means of the upper 20 and lower 21 shutters are mutualized, that is to say they are common to each of said upper 20 and lower 21 shutters, in order in particular to simplify the design of the dispensing means 15.

In the preferential embodiment illustrated in FIG. 2, the operating means are designed and configured to simultaneously operate the opening (respectively the closing) of the upper 20 and lower 21 shutters, and the shutting element 25, 26 of each of said shutters 20, 21 is designed to move according to a rectilinear motion of direction B-B', C-C' substantially orthogonal to an average direction of fall of the treatment substance 13 through the dosing chamber 16, and comprises a pair of coplanar shovels 25A, 25B, 26A, 26B mounted movable in mirror image to each other. Herein, said operating means are here mutualized, as mentioned hereinabove, and advantageously comprise:

a pair of left 27A and right 27B cross-bars, which are mounted for rectilinear translation with respect to the dosing chamber 16 and which are fastened to
a left shovel 25A, respectively a right shovel 25B, of the shutting element of the upper shutter 20, and to
a left shovel 26A, respectively a right shovel 26B, of the shutting element of the upper shutter 21,
a pair of left 28A and right 28B cross-bars, which are pivotally mounted with respect to the dosing chamber 16, and an end of which is connected to the left cross-bar 27A, respectively to the right cross-bar 27B,
and two pairs of right 29A and left 29B electromagnets, each positioned at an opposite end of the left 28A and right 28B levers, in such a way as to cause a pivoting of the levers 28A, 28B and a corresponding translation of the cross-bars 27A, 27B and the shovels 25A, 25B, 26A, 26B, when said electromagnets 29A, 29B are powered by an electric current.

It will be noted here that, if it is desired on the contrary that the opening, respectively the closing, of the upper 20 and lower 21 shutters is controlled in an asynchronous, sequential, manner, the cross-bars 27A, 27B could be pivotally mounted with respect to the dosing chamber 16, in such a way as to operate simultaneously the opening of the upper shutter 20 and the closing of the lower shutter 21, and vice versa. Of course, other suitable configurations of operating means of the upper 20 and lower 21 shutters could be contemplated, according in particular to the type and shape of the shutting element of said shutters, as well as the chosen opening/closing kinematics.

Preferentially, the installation 1 comprises a means 29 for pre-dosing the treatment substance 13, which is positioned between the source 12 of treatment substance 13 and the dosing chamber 16. Fed by the source 12 of treatment substance 13, the pre-dosing means 29 is designed to feed itself the dosing chamber 16 with a pre-dosed amount of said treatment substance 13. The dosing chamber 16 is hence not directly fed by the source 12 but, in an indirect and controlled manner, by the pre-dosing means 29. The implementation of such a pre-dosing means 29 upstream from the dosing chamber 16 makes it possible to further improve the accuracy of dosing of the amount of treatment substance 13 dispensed, by regulating in a controlled manner the amount of treatment substance 13 received by the dosing chamber 16. According to a preferential embodiment, more particularly adapted to the case of a powder or granular treatment substance 13, the pre-dosing means 29 comprises a vibratory conveyor 30 configured to bring the treatment substance 13 from the source 12 of treatment substance 13 to the dosing chamber 16. The vibratory conveyor 30 typically comprises a corridor 31, for example straight trough-shaped, to guide the treatment substance 13, and a vibrator (for example electrical) designed to transmit to the corridor 31 oscillations or vibrations, the frequency of which imparts an advance movement to the treatment substance 13 present in the corridor. The pre-dosing means 29 then also comprises control means (not illustrated) of the vibratory conveyor 30, which are designed and configured to control the vibration duration and frequency of the vibratory conveyor 30, in such a way in particular to control finely the amount of treatment substance 13 supplied to the chamber 16 by the vibratory conveyor 30. In the preferential embodiment illustrated in the Figures, an upstream end 32 of the vibratory conveyor 30 is hence positioned under a discharge port of the hopper 14, to receive from the latter the treatment substance 13 and to transport it towards the dosing chamber 16. The implementation of such a vibratory conveyor 30 advantageously makes it possible, over a given duration of feeding of the dosing chamber 16, to feed the latter in a substantially continuous and controlled manner, the treatment substance 13 spreading out in a layer of relatively constant thickness along the corridor under the effect of the vibrations imparted to the latter. By modulating the vibration duration and frequency of the vibratory conveyor 30, it is thus possible to parameterize, dose, in a particularly fine manner the amount of treatment substance 13 (for example, of the order of a few tens of milligrams) to be dispensed into the container 2 to be treated through the dosing chamber 16. Advantageously, a vibration-absorbing material is placed under, and in contact with, the corridor of the vibratory conveyor 30. This material, which can typically be in the form of a foam (for example, polyurethane or polyethylene), provides at least local attenuation of the vibration amplitude. The implementation of such a vibration-absorbing material makes it possible to further improve the homogeneity of the thickness of the layer of treatment substance 13, by limiting the risk of formation of excess and defective zones of treatment substance 13 along the length of the vibratory conveyor 30 corridor by generation of treatment substance 13 grain waves on the vibratory corridor. The presence of the vibration-absorbing material advantageously makes it possible to "smooth" this wave phenomenon and to ensure a particularly steady and constant feeding of the dosing chamber 16 with treatment substance 13. Obviously, it could nevertheless be contemplated to use other pre-dosing means than those of the preferential embodiment exposed hereinabove. For example, a screw carrier or conveyor could possibly be implemented instead of the vibratory conveyor 30 contemplated hereinabove. However, such a vibratory conveyor 30 turns out to be, on the one hand, more effective in terms of accuracy of the pre-dosing of the treatment substance 13 (in particular for the dosing of amounts of a few tens of milligrams) and, on the other hand, more robust and more reliable, in that there is in particular no risk of moving parts seizing up.

Preferably, and as illustrated in the Figures, the installation 1 comprises a funnel 33, positioned under an outlet 34 of the pre-dosing means 29, and for example under a downstream end 35 of the vibratory conveyor 30, to receive from said pre-dosing means 29 a pre-dosed amount of said treatment substance 13. The funnel 33 is provided with a discharge port 36, typically opposed to a port 37 for the feeding by the pre-dosing means 29, said discharge port 36 being connected to the inlet port 18 of the dosing chamber 16 through the upper shutter 20. Therefore, as illustrated in the Figures, the upper shutter 20 is interposed between the discharge port 36 of the funnel 33 and the inlet port 18 of the dosing chamber 16, in such a way as to intercept the flow of treatment substance 13 exiting from the funnel 33, and to thus forbid/allow the feeding of the dosing chamber 16 through the funnel 33. The funnel 33 hence allows collecting the treatment substance 13 pre-dosed by the pre-dosing means 29, and that can exit from the latter with a certain spatial dispersion, in order to gather it at the base of the funnel 33 and to then canalize it towards the inlet port 18 of the dosing chamber 16. Advantageously, the outlet 34 of the pre-dosing means 29, and in particular the downstream end 35 of the vibratory conveyor 30, is positioned at a height h2 from the feeding hole 37 that is between 5 and 20 mm.

The treatment installation 1 may have an interest for treating a glass container 2 that remains immobile relative to the treatment substance 13 dispensing means 15 during the operation of the latter. However, said installation 1 is preferentially designed to be implemented for the treatment of a glass container 2 in motion relative to the dispensing means 15, and in particular relative to the dosing chamber 16 of the latter, whereas the dispensing means 15 remains immobile in the terrestrial reference system. Typically, the glass container 2 may be arranged on a conveyor 38, with its bottom 8 resting on the conveyor 38 and its opening 5 directed upward. The dosing chamber 16 of the dispensing means 15 is arranged above and facing the conveyor 38 in such a way that the outlet port 19 of the dosing chamber 16 can be positioned above and facing the opening 5 of the container 2 to be treated when the latter is moved by the conveyor 38 (FIG. 1). In this respect, the installation 1 can, according to a variant, comprise such a conveyor 38 (for example, of the belt or roll type). According to another alternative, the installation 1 may not comprise a conveyor 38 as such, but be sized and configured to be arranged and operated in combination with such an external conveyor 38.

Advantageously, the installation 1 comprises a means 39 for detecting the glass container 2, which is connected to the operating means of the lower shutter 21 to control the opening of the lower shutter 21 only when the container 2 is positioned under the dosing chamber 16, and preferably under and facing the outlet port 19 of the latter. Therefore, the lower shutter 21 can advantageously be kept in closed configuration in the absence of container 2, and the dispensing means 15 of the installation 1 thus does not dispense treatment substance 13 through the dosing chamber 16 in the absence of container 2 under the latter. A useless dispensing of treatment substance 13 is hence avoided. According to an alternative, the detection means 39 is configured to detect the effective presence of a glass container 2 under the dosing chamber 16, and preferably under and facing the outlet port 19 of the latter. According to a preferential alternative, said detection means 39 is configured to detect the arrival of the container 2 on the conveyor 38, upstream from the dosing chamber 16 and preferably upstream from the outlet port 19 of the latter, that is to say before said container 2, moved by the conveyor 38, effectively arrives under the dosing chamber 16 and preferably under and facing the outlet port 19 of the latter. According to this preferential alternative, the installation 1 advantageously comprises a control unit 40 that is connected, mechanically or electrically, on one hand to the container 2 detection means 39, and on the other hand to the operating means of the lower shutter 21, to synchronize the opening of the lower shutter 21 with the arrival of the container 2 under the dosing chamber 16, and preferably under and facing the outlet port 19 of the latter. Such a synchronization may typically be obtained using a timer and, in particular, from the knowledge of the distance between the zone of detection of the container 2 by the detection means 39 and the position of the outlet port 19 of the dosing chamber 16, the speed of displacement of the container 2 on the conveyor 38, as well as the size of the container 2.

For example, the detection means 39 is an optical barrier (or light barrier) and comprises either a light beam emitter (for example, a visible or infrared laser beam) positioned opposite a photoelectric cell, or a detection cell comprising both a light beam emitter (for example, a visible or infrared laser beam) and a photoelectric cell and a light reflector positioned opposite a photoelectric cell, as illustrated in FIGS. 1 and 2. The detection cell 41 and the reflector 43 are advantageously positioned on either side of the moving path of the container 2, at a known distance from the dosing chamber 16, and preferably from the outlet port 19 of the latter. The detection cell 41 emits a light beam 42 (represented in dotted line in FIG. 1), which, in the absence of container 2, is reflected by the reflector 43 and detected by the photoelectric cell of the detection cell 41. In the presence of a container 2, the light beam is interrupted (or at least disturbed) by the container 2, in such a way that the photoelectric cell does not detect the light beam (or detects a disturbed light beam), which signs the presence of a container 2. In this case, the control unit 40 controls the opening of the lower shutter 21 through the operating means of the latter, either immediately (case of detection of the effective presence of a glass container 2 under the outlet port 19 of the dosing chamber 16), or according to a predefined timing (case of detection of the presence of a glass container 2 upstream from the outlet port 19 of the dosing chamber 16). In a particularly advantageous manner, such a detection means 39 of the optical barrier type will be designed and arranged in such a way that the light beam emitted is interrupted by the neck 10 or the ring 11 of a container 2, and not by the body of the latter, in order to allow a finer synchronization of the operation of the lower shutter 21, and hence a more accurate dispensing of the treatment substance 13 into the cavity 4 of the container 2, when the latter arrives under the outlet port 19 of the dosing chamber 16. Obviously, other known and suitable detection means, not necessarily optical, may be contemplated (proximity sensors, weight sensors, etc.).

The installation 1 preferentially comprises a central control unit 44, which is connected to said container 2 detection means 39 and to control means of the pre-dosing means 29 to power the pre-dosing means 29 on when the container 2 is detected upstream from the outlet port 19 of the dosing chamber 16. Said central control unit 44 may possibly be merged with or include the above-mentioned control unit 40. In particular, in the preferential case in which the pre-dosing means 29 comprises the vibratory conveyor 30 contemplated hereinabove, said central control unit 44 is hence advantageously connected on the one hand to said detection means 39 of the container 2 and on the other hand to the control means of the vibratory conveyor 30, in such a way as to make the vibratory conveyor 30 vibrate, at a predefined frequency and preferably for a predefined duration, as soon as the container 2 is detected upstream from the outlet port 19 of the dosing chamber 16. Such an anticipation of the treatment substance 13 pre-dosing by the pre-dosing means 29 contributes to further improve the speed of dispensing of the treatment substance 13 by the installation 1, and hence the treatment rate, while ensuring a particularly accurate dosing of the amount of treatment substance 13 so dispensed.

As introduced hereinabove, the invention also relates as such a method for treating the inner face 6 of the wall 3 of a glass container 2 (such as a vial), which wall 3, in accordance with the above description of said container 2, delimits an accommodation cavity 4 for a product and an opening 5 providing access to said accommodation cavity 4. The treatment method according to the invention, as will be described in more details hereinafter, is preferentially intended to be implemented using a treatment installation 1 as disclosed hereinabove. Reciprocally, the treatment installation described hereinabove is advantageously intended to implement the treatment method according to the invention. Therefore, the features, definitions, effects and advantages described hereinabove in relation with the treatment installation advantageously apply mutatis mutandis to the treatment method according to the invention, and vice versa. That being said, the treatment installation according to the invention is obviously not limited to the sole implementation of the treatment method according to the invention, and the latter is conversely not limited to an implementation using only a treatment installation as described hereinabove.

The treatment method according to the invention comprises the supply of a source 12 of a powder or granular treatment substance 13, said source 12 and treatment substance 13 being advantageously in accordance with the above description in relation with the treatment installation 1. In particular, said source 12 may comprise a tank or hopper 14, adapted to receive and store at least temporarily an amount of ready-to-use treatment substance 13. As an alternative, the source 12 could comprise a device for manufacturing or preparing said treatment substance 13 in situ.

Said method also comprises a step of dispensing said treatment substance 13 into the accommodation cavity 4 of the container 2. According to the invention, said dispensing step is carried out using a dispensing means 15 comprising
  at least one dosing chamber 16 that extends between an inlet port 18 fed by said source 12 of treatment substance 13 and an opposite outlet port 19 positioned above, and preferably facing, the opening 5 of the container 2,
  as well as an upper shutter 20 (or upper valve) and a lower shutter 21 (or lower valve) of the dosing chamber 16, positioned in a staggered manner at the inlet port 18 and the outlet port 19 of the dosing chamber 16.

Advantageously, said dispensing step is carried out using dispensing device 15, dosing chamber 16 and upper 20 and lower 21 shutters in accordance with those of the installation 1 according to the invention. As explained above, the implementation of such a dosing chamber 16 and such upper 20 and lower 21 shutters according to the invention makes it possible to dose and dispense in an accurate, fast and efficient manner an amount of the treatment substance 13 into a container 2 to be treated, the opening 5 of which is located under the outlet port 19 of the dosing chamber 16. It is indeed possible, by controlling the speed and frequency of opening/closing the upper 20 and lower 21 shutters, to form within the dosing chamber 16 an accurate dose of treatment substance 13, and to compact, pack, this treatment substance 13, under the effect of its own weight, against the lower shutter 21, before letting the so-compacted dose flow towards the opening 5 of the container 2 to be treated. By adapting the shape, size and capacity of the dosing chamber 16 as needed, it thus becomes possible to treat, using the treatment method according to the invention, glass containers of any size and capacity, and that even with very high rates.

Preferably, the dosing chamber 16 remains preferentially immobile (in the terrestrial reference system, both in translation and in rotation) during the treatment of the container 2, and the upper 20 and lower 21 shutters remaining positioned at the inlet 18 and outlet 19 ports of the dosing chamber 16. For example, the dosing chamber 16 may be mounted immobile on a frame 24, said frame 24 being itself immobilized with respect to the ground.

The treatment method may have an interest for treating a glass container 2 that remains immobile relative to the treatment substance 13 dispensing means 15 during the operation of the latter. However, said treatment method more preferentially relates to a glass container 2 that, at least during the above-mentioned dispensing step, is in motion relative to the dispensing means 15, and in particular relative to the dosing chamber 16 of the latter, whereas the dispensing means 15 remains immobile in the terrestrial reference system. Typically, the glass container 2 may be arranged on a conveyor 38, with its bottom 8 resting on the conveyor 38 and its opening 5 directed upward, the dosing chamber 16 of the dispensing means 15 being arranged above and facing the conveyor 38 in such a way that the outlet port 19 of the dosing chamber 16 comes above and facing the opening of the container 3 to be treated when the latter is moved by the conveyor 38.

Preferably, each of the upper 20 and lower 21 shutters comprises a shutting element 25, 26 that moves according to a rectilinear motion of direction substantially orthogonal to an average direction of fall (average direction of flow) of said treatment substance 13 through the dosing chamber 16. Even more preferably, said shutting element 25, 26 comprises a pair of coplanar shovels 25A, 25B, 26A, 26B mounted movable in mirror image to each other. The shovels 25A, 25B, 26A, 26B of each pair of shovels 25A, 25B, 26A, 26B thus move away from each other, by translation in the same plane, at the same speed and with the same length of travel, to bring the corresponding shutter 20, 21 in open configuration and to hence allow the passage of the treatment substance 13 through the shutter 20, 21. Conversely, the shovels 25A, 25B, 26A, 26B of each pair of shovels 25A, 25B, 26A, 26B move towards each other, in the same way, to bring the corresponding shutter 20, 21 in closed configuration and thus to close the corresponding inlet 18 or outlet 19 port of the dosing chamber 16. As explained above in relation with the description of the treatment installation 1, such particular configuration and kinematics of the upper 20 and lower 21 shutters contribute to simplify the implementation of the treatment method, while improving the rapidity and accuracy (in terms of dosage and spatial distribution) of the step of dispensing the treatment substance 13 into the cavity 4 of the container 2 to be treated.

During said dispensing step, said upper 20 and lower 21 shutters open, respectively close, preferably simultaneously, although an asynchronous, sequential, opening/closing could also be contemplated, in accordance with the explanations of operation and technical benefits given hereinabove as regards the installation 1. In this respect, the dispensing means 15 implemented for dispensing the treatment substance 13 may advantageously include means for operating the upper 20 and lower 21 shutters, designed and configured to operate the opening, respectively closing, of the upper 20 and lower 21 shutters in a simultaneous manner, as described hereinabove in relation with the treatment installation 1.

Preferably, the opening of the lower shutter 21 is controlled only when the container 2 is located under the dosing chamber 16, and more preferably under and facing the outlet port 19 of the latter, in such a way that the dosing chamber 16 does not dispense treatment substance 13 in the absence of container 2 to be treated. Thus, the step of dispensing the treatment substance 13 is advantageously carried out only in the presence of a glass container 2 positioned under the dosing chamber 16 of the dispensing means 15, which makes it possible to avoid a useless dispensing of treatment substance 13. For example, the treatment method may implement in this respect a means 39 for detecting the container 2 (such as an optical barrier), which is connected to the operating means of the lower shutter 21 to control the opening of the lower shutter 21 only when the container 2 is positioned under the dosing chamber 16.

In order to further improve the accuracy of dosing of the amount of treatment substance 13 dispensed during the dispensing step, the treatment method preferentially comprises an operation of pre-dosing the treatment substance 13 coming from the source 12 of treatment substance 13, to feed the dosing chamber 16 with a pre-dosed amount of said treatment substance 13. Thus, the dosing chamber 16 does not receive massively the treatment substance 13, directly from the source 12 of treatment substance 13, but on the contrary receives, in a controlled, regulated manner, a pre-dosed amount of said treatment substance 13. Advantageously, said pre-dosing operation is carried out using a pre-dosing means 29 as that described hereinabove in relation with the treatment installation 1. In particular, said pre-dosing step is advantageously made using a vibratory conveyor 30, such as that described hereinabove, which brings said treatment substance 13 from said source 12 of treatment substance 13 to the dosing chamber 16. Indeed, the use of such a vibratory conveyor 30 suits particularly to the case in which the treatment substance 13 is in powder or granular form, as it advantageously makes it possible to feed the dosing chamber 16, over a given duration of feeding of the latter, in a substantially continuous and controlled manner. By modulating the vibration duration and frequency of the vibratory conveyor 30, it is thus possible to set, pre-dose, in a particularly fine manner the amount of treatment substance 13 (for example, of the order of a few tens of milligrams) to be dispensed into the container 2 to be treated through the dosing chamber 16. That being said, the pre-dosing operation could nevertheless be carried out in a different way, according in particular to the nature and amount of treatment substance 13 that is desired to be pre-dosed upstream from the dosing chamber 16.

Particularly advantageously, in the case where the container 2 to be treated is positioned on a conveyor 38 designed to bring the container 2 under the dosing chamber 16, as contemplated hereinabove, the treatment method comprises a step of detection of the container 2 to detect the arrival of the container 2 on said conveyor 38 upstream from the outlet port 19 of the dosing chamber 16, and to start the pre-dosing operation when the container 2 is detected upstream from the outlet port 19 of the dosing chamber 16. Such a detection step may be advantageously implemented using the detection means 39 described hereinabove in relation with the treatment installation 1, and in particular an optical barrier. It is thus advantageously possible to

- detect, at a time T0, the presence of the container 2 on the conveyor 38 upstream from the outlet port 19 of the dosing chamber 16, and to start at this time TO the pre-dosing of the treatment substance 3 (for example, by the vibratory conveyor 30) for a given time T1 (for example, 30 ms), corresponding to the time required for the container to arrive under the outlet port 19 of the dosing chamber 16,
- then to continue the pre-dosing step for a time T2, corresponding preferentially to a duration of simultaneous opening of the upper 20 and lower 21 shutters (for example, 50 ms), in such a way as to pre-dose a predetermined amount of treatment substance 13.

As explained hereinabove, such an anticipation of the step of treatment substance 13 pre-dosing contributes to further improve the speed of treatment substance 13 dispensing, and hence the treatment rate, while ensuring a particularly accurate dosing of the amount of treatment substance 13 so dispensed.

Advantageously, the amount of treatment substance 13 so pre-dosed at the pre-dosing step, is received through a funnel 33, a discharge port 36 of which is connected to the inlet port 18 of the dosing chamber 16 through the upper shutter 20.

The treatment installation 1 and method described hereinabove may advantageously be implemented to carry out different types of treatment (doping, chemical hardening, etc.) of the inner face 6 of the wall of a glass container 2, according in particular to the nature of the treatment substance 13 used. According to a preferential embodiment, said installation 1 and method are more specifically installation 1 and method for dealkalization treatment of the inner face 6 of the wall 3 of the glass container 2. It is understood that, in this case, the glass of said concerned container 2 is then a glass containing at least one alkaline species, such as sodium in particular. It may then be a container made of soda-lime-silica glass ("Type III" glass), or also a container made of borosilicate glass ("Type I" glass), insofar as such a glass does contain at least one alkaline species, although in lower quantity than in the case of a soda-lime-silica glass. As already explained hereinabove, such a dealkalization method aims to extract, typically over a depth of several dozens of nanometres, the alkaline ions (and in particular the sodium ions) present in the glass in the vicinity of the surface of the inner face 6 of the wall 3 of the container 2. Once the container 2 treated, the glass in the vicinity of the surface of the inner face 6 of the wall 3 of the container 2 is thus, preferably significantly, depleted in alkaline ions.

In the case of such a dealkalization treatment, the treatment substance 13 (or dealkalization substance) is more specifically designed to react under heat to cause a dealkalization of the glass, typically in the vicinity of the surface of the inner face 6 of the wall 3. As will be detailed hereinafter, said inner face 6 is then brought, before or after the dispensing of the treatment substance 13 into the cavity 4 of the container 2, to a treatment temperature that is sufficient to cause the reaction of the treatment substance 13. It may be a treatment substance 13 that, as such, is capable of coming into direct contact with the hot inner face 6 of the wall 3 of the container 2 to react, under heat, with one or several alkaline species present in the glass forming the wall 3 of the container 2 or also a substance capable of decomposing under the heat inside the cavity 4 of the container 2, due to the temperature of the inner face 6 of the wall 3, to produce one or several new chemical species or substances, which are capable of coming into contact with the surface of the inner face 6 of the wall 3 of the container 2 and reacting with one or several alkaline species present in the glass forming said wall 3 in order to obtain the desired effect of dealkalization. Preferably, said treatment substance 13 comprises a sulphur compound, and more preferably a compound containing sulphur combined with oxygen, in powder (for example, crystals) or granular form. Even more preferentially, said sulphur compound is an ammonium sulphate. Indeed, such a treatment substance 13 based on powder or granular ammonium sulphate is relatively easy and inexpensive to implement, and allows a particularly efficient dealkalization treatment of the glass container 2. That being said, other dealkalization treatment substances 13 (such as, for example, ammonium chloride or aluminium ammonium sulphate) could obviously be used.

In this respect, the treatment installation 1 is then more specifically designed to dispense, introduce, the treatment substance 13 into the accommodation cavity 4 of the glass container 2 whereas the inner face 6 of the wall 3 of said glass container 2 is at a temperature of at least 350° C., preferably between 350° and 850° C., preferably between 350° C. and 800° C., more preferably between 350° C. and 700° C., in such a way as to allow the reaction of the substance 13 under heat. In this respect, the installation 1 can advantageously comprise a means for supplying a glass container 2 as described hereinabove, (at least) the inner face 6 of the wall 3 of which is at a temperature of at least 350° C., preferably between 350° C. and 850° C., preferably between 350° C. and 800° C., more preferably between 350° C. and 700° C. According to an alternative, this supply means could comprise a heating means, of any known suitable type (for example, of the arch or oven type), designed to heat a pre-existing glass container 2 as described hereinabove and the inner face of the wall of which is initially at a temperature close (if not equal) to the ambient temperature, in such a way that the temperature of at least the inner face of the container wall reaches a value of at least 350° C., preferably between 350° C. and 850° C., preferably between 350° C. and 800° C., more preferably between 350° C. and 700° C. According to another, more preferential alternative, the means for supplying the container 2 could comprise a system for collecting a glass container 2 as described hereinabove at the exit of a machine for hot forming a glass container from a glass preform (for example, an IS machine), while said container 2 is still hot enough so that (at least) the inner face 6 of the wall 3 of said container 2 is at a temperature of at least 350° C., preferably between 350° C. and 850° C., preferably between 350° C. and 800° C., more preferably between 350° C. and 700° C. As an alternative, the installation 1 as such may not comprise such a means for supplying a container 2 (at least) the inner face 6 of the wall 3 of which is at a temperature of at least 350° C., preferably between 350° C. and 850° C., preferably between 350° C. and 800° C., more preferably between 350° C. and 700° C., except for the above-mentioned conveyor 38, but it is nonetheless designed (particularly in terms of choice of materials, etc.) to be able to operate satisfactorily in the presence of a container 2 brought at such a temperature.

As an alternative, but less preferentially, the installation 1 as such may not be specifically designed to introduce the treatment substance 13 into the accommodation cavity 4 of the glass container 2 whereas the inner face 6 of the wall 3 of the latter is at a temperature of at least 350° C., preferably between 350° and 850° C., preferably between 350° C. and 800° C., more preferably between 350° C. and 700° C., but on the contrary whereas said inner face 6 is at ambient temperature. In this case, the installation 1 could then comprise a means for heating the container 2, such as an annealing arch, positioned downstream from the dispensing means 15, to bring the inner face 6 of the wall 3 of the container 2 to a temperature of at least 350° C., preferably between 350° C. and 850° C., preferably between 350° C. and 800° C., more preferably between 350° C. and 700° C., once the treatment substance 13 dispensed into the container 2.

Reciprocally, as regards the treatment method, the step of dispensing the treatment substance 13 into the accommodation cavity 4 of the glass container 2 is carried out, according to a preferential alternative, whereas the inner face 6 of the wall 3 of said glass container 2 is at a temperature of at least 350° C., preferably between 350° C. and 850° C., preferably between 350° C. and 800° C., more preferably between 350° C. and 700° C. In this respect, the treatment method may advantageously comprise a step of supplying a glass container 2, as described hereinabove, (at least) the inner face 6 of the wall 3 of which is at a temperature of at least 350° C., preferably between 350° C. and 850° C., preferably between 350° C. and 800° C., more preferably between 350° C. and 700° C. Such a step of supplying the container 2 may comprise an operation of heating, using any known suitable heating means, a pre-existing glass container as described hereinabove and the wall inner face of which is initially at a temperature close (if not equal) to the ambient temperature, in order to heat it in such a way that the temperature of at least the inner face of its wall reaches a value of at least 350° C., preferably between 350° C. and 850° C., preferably between 350° C. and 800° C., more preferably between 350° C. and 700° C. As an alternative, and more advantageously, the step of supplying the container 2 may comprise an operation of collecting a glass container 2 as described hereinabove at the exit of a machine for hot forming a glass container from a glass preform, whereas said container 2 is still hot enough so that (at least) the inner face 6 of the wall 3 of said container 2 is at a temperature of at least 350° C., preferably between 350° C. and 850° C., preferably between 350° C. and 800° C., more preferably between 350° C. and 700° C. According to such a preferential alternative, the method according to the invention thus does not require the implementation of a particular heating operation, the inner face 6 of the wall 3 of the container 2 being heated to a temperature of at least 350° C., preferably between 350° C. and 850° C., preferably between 350° C. and 800° C., more preferably between 350° C. and 700° C., as a direct consequence of a previous forming operation on said container 2. Such a forming operation can be carried out using any known glass container forming installation, such as for example an IS machine in the case of a container made of moulded glass. The implementation of the method according to the invention is thus simplified, in particular when the latter is implemented in an industrial context of manufacture of glass containers.

According to another alternative, the step of dispensing the treatment substance 13 into the accommodation cavity 4 of the glass container 2 may be carried out whereas the inner face 6 of the wall 3 of said glass container 2 is at ambient temperature. In this case, the treatment method may comprise, after said dispensing step, a step of heating the container 2 into which the treatment substance 13 has been dispensed, to bring the inner face 6 of the wall 3 of said container 2 to a temperature of at least 350° C., preferably between 350° C. and 850° C., preferably between 350° C. and 800° C., more preferably between 350° C. and 700° C. Such a heating step may for example be carried out in an annealing arch within which the container 2 is placed at the end of said treatment substance 13 dispensing step.

As explained hereinabove, the invention is however not limited to such a dealkalization treatment. Indeed, the treatment installation and method could also be treatment installation and method for doping, chemically hardening, etc., the inner face 6 of the wall 3 of the glass container 2, according in particular to the nature of treatment substance 13 used, particularly when the aim is to dose and dispense in an accurate, fast and efficient manner an amount of the treatment substance 13 into a container 2 to be treated, the opening 5 of which is located under the outlet port 19 of the dosing chamber 16.

In order to guarantee an excellent spatial accuracy of dispensing the treatment substance into the container 2 to be treated, in particular at high treatment rates, while avoiding damaging the dosing chamber 16 of the dispensing means 15 under the heat released by the container 2, the treatment installation 1 is preferentially designed and arranged in such a way that the outlet port 19 of the dosing chamber 16 (or, as the case may be, the lower end 23 of the nozzle 22 connected to said outlet port 19) can be positioned above and facing the opening 5 of the container 2 (as contemplated hereinabove), at a distance d preferentially between 1 cm and 20 cm, and even more preferentially between 1 cm and 5 cm (for example, 15 mm) from said opening 5. Symmetrically, during the dispensing step of the corresponding treatment method, the outlet port 19 of the dosing chamber 16 (in which, as the case may be, the lower end 23 of the nozzle 22 connected to said outlet port 19) is advantageously positioned above and facing the opening 5 of the container 2 (as contemplated hereinabove), at a distance d preferentially between 1 cm and 20 cm, and even more preferentially between 1 cm and 5 cm (for example, 15 mm) from said opening 5.

POSSIBILITY OF INDUSTRIAL APPLICATION

The invention finds its industrial application in the design, making and implementation of installations and methods for treating the lower face of the wall of the glass containers, and in particular pharmaceutical and diagnostic containers.

The invention claimed is:

1. An installation (1) for treating an inner face (6) of a wall (3) of a glass container (2), which wall (3) delimits an accommodation cavity (4) for a product and an opening (5) providing access to said accommodation cavity (4), said installation (1) comprising a source (12) of powder or granular treatment substance (13) and a means (15) for dispensing said treatment substance (13) into the accommodation cavity (4) of the glass container (2), said installation (1) being characterized in that said dispensing means (15) comprises at least one dosing chamber (16) that extends between an inlet port (18) fed by said source (12) of treatment substance (13) and an opposite outlet port (19) intended to be positioned above the opening (5) of the glass container (2), as well as an upper shutter (20) and a lower shutter (21) of the dosing chamber (16) positioned in a staggered manner at the inlet port (18) and the outlet port (19), respectively, of the dosing chamber (16).

2. The installation (1) according to the preceding claim, characterized in that it comprises a frame (24), intended to be immobilised with respect to the ground, and in that said dosing chamber (16) is immobilised with respect to said frame (24).

3. The installation (1) according to claim 1, characterized in that it comprises means for operating said upper (20) and lower (21) shutters designed and is configured to simultaneously open and then simultaneously close said upper (20) and lower (21) shutters.

4. The installation (1) according to claim 3, characterized in that it comprises a means (39) for detecting the glass container (2), which is connected to the operating means of said lower shutter (21) to control the opening of the lower shutter (21) only when the container (2) is positioned under the dosing chamber (16).

5. The installation (1) according to claim 4, characterized in that said means for detecting (39) is configured to detect the arrival of the glass container (2) on a conveyor (38), upstream from the outlet port (19) of the dosing chamber (16), and in that said installation (1) comprises a central control unit (44), which is connected to said glass container (2) means for detecting (39) and to pre-dosing control means of the pre-dosing means (29) to power the pre-dosing means (29) on when the glass container (2) is detected upstream from the outlet port (19) of the dosing chamber (16).

6. The installation (1) according to claim 1, characterized in that it comprises a means (29) for pre-dosing said treatment substance (13), positioned between the source (12) of treatment substance (13) and the dosing chamber (16) to feed the dosing chamber (16) with a pre-dosed amount of said treatment substance (13).

7. The installation (1) according to claim 6, characterized in that said pre-dosing means (29) comprises a vibratory conveyor (30) configured to bring said treatment substance (13) from said source (12) of treatment substance (13) to the dosing chamber (16).

8. The installation (1) according to claim 6, characterized in that it comprises a funnel (33), which is positioned under an outlet (34) of the pre-dosing means (29) to receive from said pre-dosing means (29) said pre-dosed amount of said treatment substance (13), and a discharge port (36) of which is connected to the inlet port (18) of the dosing chamber (16) through the upper shutter (20).

9. The installation (1) according to claim 1, characterized in that each of said upper (20) and lower (21) shutters comprises a shutting element (25, 26) designed to move according to a rectilinear motion of direction substantially orthogonal to an average direction of fall of said treatment substance (13) through the dosing chamber (16).

10. The installation (1) according to the preceding claim, characterized in that said shutting element (25, 26) comprises a pair of coplanar shovels (25A, 25B, 26A, 26B) mounted movable in mirror image to each other.

11. The treatment installation (1) according to claim 1, characterized in that it is an installation (1) for dealkalization treatment of the inner face (6) of the wall (3) of said glass container (2), said installation (1) being designed to dispense said treatment substance (13) into the accommodation cavity (4) of the container (2) whereas the inner face (6) of the wall (3) of said glass container (2) is at a temperature of at least 350° C., said treatment substance (13) being designed to react under the heat of the inner face (6) of the wall (3) of the container (2) to cause a dealkalization of the glass.

12. A method for treating an inner face (6) of a wall (3) of a glass container (2), which wall (3) delimits an accommodation cavity (4) for a product and an opening (5) providing access to said accommodation cavity (4), said method comprising the supply of a source (12) of powder or granular treatment substance (13) and a step of dispensing said treatment substance (13) into the accommodation cavity (4) of the glass container (2) using a dispensing means (15), said method being characterized in that said dispensing means (15) comprises at least one dosing chamber (16) that extends between an inlet port (18) fed by said source (12) of treatment substance (13) and an opposite outlet port (19) intended to be positioned above the opening (5) of the glass container (2), as well as an upper shutter (20) and a lower shutter (21) of the dosing chamber (16) positioned in a staggered manner at the inlet port (18) and the outlet port (19), respectively, of the dosing chamber (16).

13. The method according to claim 12, characterized in that said dosing chamber (16) remains immobile during the treatment of the glass container.

14. The method according to claim 12, characterized in that said upper (20) and lower (21) shutters simultaneously open, and then simultaneously close, during said dispensing step.

15. The method according to claim 14, characterized in that the opening of the lower shutter (21) is controlled only when the glass container (2) is positioned under the dosing chamber (16).

16. The method according to claim 12, characterized in that it comprises an operation of pre-dosing said treatment substance (13) coming from the source (12) of treatment substance (13), to feed the dosing chamber (16) with a pre-dosed amount of said treatment substance (13).

17. The method according to claim 16, characterized in that it comprises a step of detection of the container (2) to detect the arrival of the glass container (2) on a conveyor (38) upstream from the outlet port (19) of the dosing chamber (16), and to start the pre-dosing operation when the glass container (2) is detected upstream from the outlet port (19) of the dosing chamber (16).

18. The method according to claim 16, characterized in that said pre-dosing operation is carried out using a vibratory conveyor (30) that brings said treatment substance (13) from said source (12) of treatment substance (13) to the dosing chamber (16).

19. The method according to claim 12, characterized in that each of the upper (20) and lower (21) shutters comprises a shutting element (25, 26) that moves according to a rectilinear motion of direction substantially orthogonal to an average direction of fall of said treatment substance (13) through the dosing chamber (16).

20. The method according to the preceding claim, characterized in that said shutting element (25, 26) comprises a pair of coplanar shovels (25A, 25B, 26A, 26B) mounted movable in mirror image to each other.

21. The method according to claim 12, characterized in that it is a method for dealkalization treatment of the inner face (6) of the wall (3) of said glass container (2).

22. The method according to claim 21, characterized in that said step of dispensing the treatment substance (13) is carried out whereas the inner face (6) of the wall (3) of said glass container (2) is at a temperature of at least 350° C., said treatment substance (13) being designed to react under the heat of the inner face (6) of the wall (3) of the container (2) to cause a dealkalization of the glass.

\* \* \* \* \*